United States Patent
Ricordel

(10) Patent No.: US 6,265,849 B1
(45) Date of Patent: Jul. 24, 2001

(54) ELECTRICAL APPARATUS COMPRISING A BATTERY AND METHOD OF DETECTING THE DISCONNECTION OF A BATTERY

(75) Inventor: Eloi Ricordel, Le Mans (FR)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/469,446

(22) Filed: Dec. 21, 1999

(30) Foreign Application Priority Data

Dec. 29, 1998 (FR) .................................................. 98 16568

(51) Int. Cl.[7] .............................. H02J 7/01; G01N 27/416
(52) U.S. Cl. ............................ 320/132; 320/165; 324/427
(58) Field of Search ..................................... 320/132, 136, 320/149, 165, DIG. 12; 324/427, 428

(56) References Cited

U.S. PATENT DOCUMENTS

| | | | |
|---|---|---|---|
| 4,714,868 | * 12/1987 | Maruyama et al. | 320/149 |
| 5,349,280 | 9/1994 | Kim | 320/128 |
| 5,631,538 | * 5/1997 | Komrska | 320/155 |
| 5,793,186 | * 8/1998 | Watabe | 320/112 |
| 5,828,202 | * 10/1998 | Tamai | 320/141 |
| 5,949,220 | * 9/1999 | Ide et al. | 320/165 |
| 6,043,626 | * 3/2000 | Snyder et al. | 320/113 |

FOREIGN PATENT DOCUMENTS 2270445A   3/1994   (GB)   ................ H04Q/7/04

\* cited by examiner

Primary Examiner—Peter S. Wong
Assistant Examiner—Gregory J. Toatley, Jr.
(74) Attorney, Agent, or Firm—Jack D. Slobod

(57) ABSTRACT

This apparatus includes a detector (60) for detecting a change of accumulator (21). Thus a counter (DECH) measuring the charge state of this accumulator may be re-initialized if the accumulator is charged even during a period of inactivity of the apparatus.

5 Claims, 3 Drawing Sheets

ELECTRICAL APPARATUS COMPRISING A BATTERY AND METHOD OF DETECTING THE DISCONNECTION OF A BATTERY

FIELD OF THE INVENTION

The present invention relates to an electrical apparatus having supply terminals to be supplied by a battery. The invention also relates to a method of detecting the disconnection of a battery.

DESCRIPTION OF THE RELATED ART

Such apparatus are well known and find many applications, notably in the field of portable telephony devices which are supplied with power by a battery whose state of charge makes it necessary to be controlled very well.

U.S. Pat. No. 5,349,280 describes a circuit intended to protect a battery among several others.

SUMMARY OF THE INVENTION

The present invention proposes an apparatus in which charge or discharge measurements of the battery are made. However, these measurements may be made wrong if the battery is changed by the user for a variety of reasons.

Thus, by the invention one is assured that the state of charge and/or discharge of the battery is well known, which ensures a longer useful life for these elements, because they can be charged advisedly.

To avoid distorting the charging and/or discharging measurements of a battery when it is changed, such an apparatus is characterized in that it includes a detecting circuit for detecting a change of battery.

BRIEF DESCRIPTION OF THE DRAWINGS

These and other aspects of the invention are apparent from and will be elucidated, by way of non-limitative example, with reference to the embodiment(s) described hereinafter.

In the drawings.

DESCRIPTION OF PREFERRED EMBODIMENTS

Figure 1:
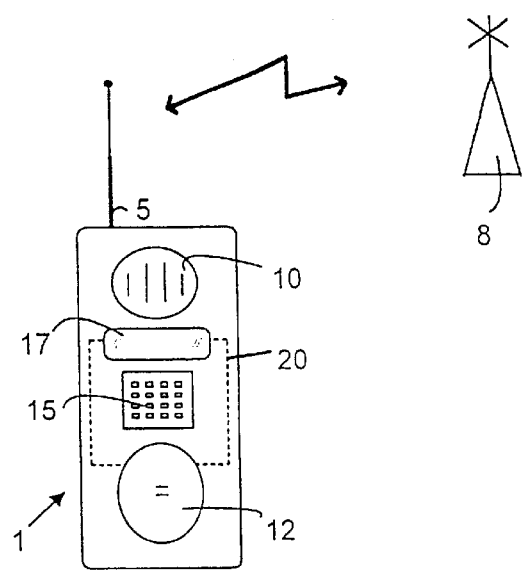
FIG. 1 shows a system comprising at least an apparatus in accordance with the invention.
Figure 2:
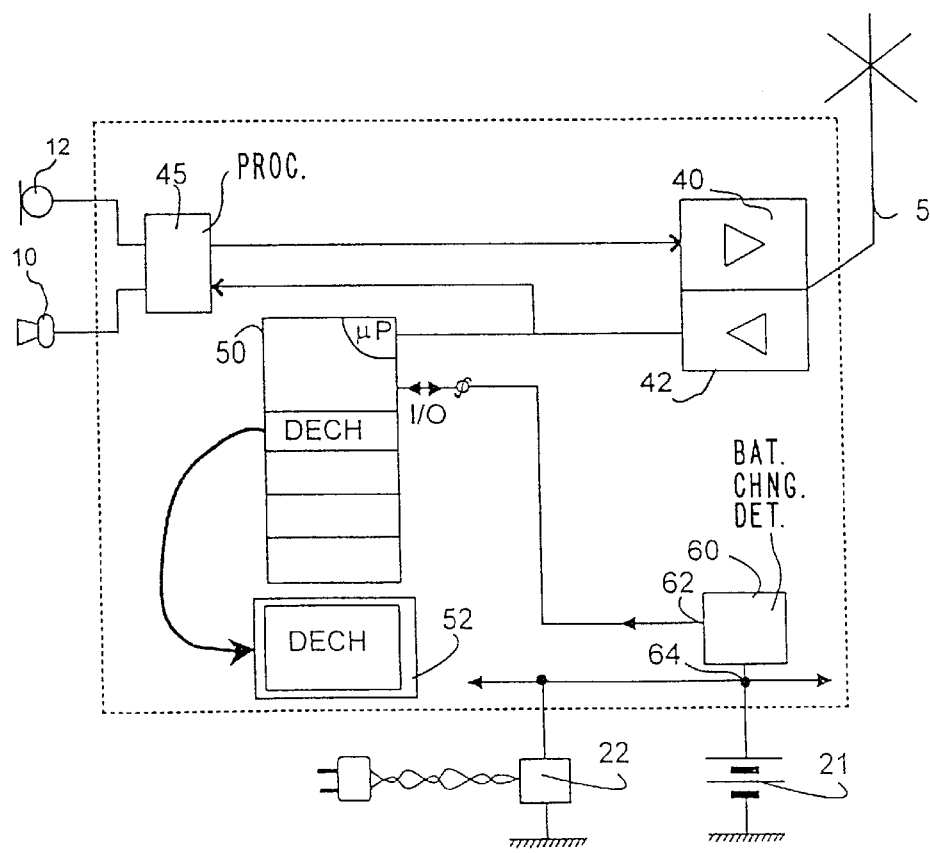
FIG. 2 shows the diagram of an apparatus in accordance with the invention.

In FIG. 1 reference 1 indicates an apparatus in accordance with the invention. In this example described here it is a mobile station belonging to a wireless telephone system formed by a cellular network. This station has an antenna 5 that enables it to receive and transmit radio waves from and to a base station 8 of a radio network of the cellular telephony type e.g. GSM, AMPS and others. The mobile station 1 comprises an earphone 10, a microphone 12, a keypad 15 and a display screen 17. The dotted line represents an electronic part 20 located inside the station. This part 20 is supplied with power either by a battery 21 or by a power line 22 connected to the power grid. This part is shown in more detail in FIG. 2. It comprises a transmission assembly 40 and a receiving assembly 42 for transmitting and for receiving various information signals usual in cellular telephony. These transmission and receiving parts are connected to a microphone 12 and to the earphone 10 via a speech processing element 45. The control of such a mobile station is ensured by a microprocessor assembly 50.

It is important to monitor the state of charge of the battery 21. Therefore, a charge/discharge counter DECH controlled by the assembly 50 measures the time during which the apparatus is used. When the apparatus is used for the first time, the presence of the battery is tested and the counter DECH starts counting periods of time. The contents of this counter determine the state of charge of the battery. When the station is switched off, the contents of this counter are stored in a non-volatile memory 52 (EEPROM memory). The assembly 50 has an I/O access which may be programmed as an output terminal or an input terminal as this is well known in this technique.

The problem then occurring is that, if the battery in place is changed to another battery that is more or less well-charged, the contents of the counter DECH are no longer relevant the charge of the battery that is put in place. To avoid this problem, the invention proposes a detector 60 for detecting the change of battery. This detector has an input/output or control terminal 62 intended to be connected to said terminal of the assembly 50 and also an input terminal 64 which is connected to one pole of the battery 21.

Figure 3:
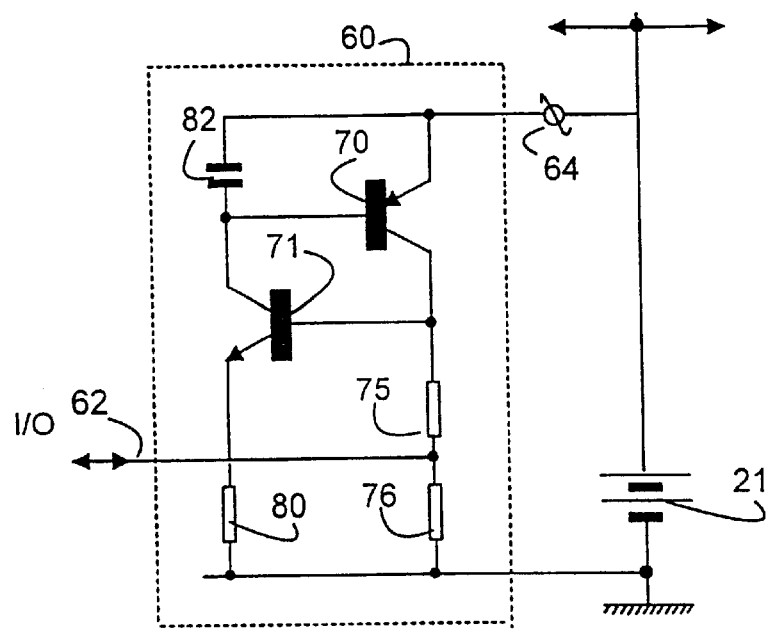
FIG. 3 shows the diagram of a detector of a change of battery.

The embodiment of this detector for detecting the change of battery is shown in FIG. 3.

It comprises two transistors 70 and 71 the behaviour of which are as switches. The emitter of the transistor 71 is connected to the positive pole of the battery 21, while its collector is connected to ground via a voltage divider formed by resistors 75 and 76. It is the common point of these two resistors that forms the 62. The emitter of the transistor 71 is connected to ground via a resistor 80. The collector is connected, on the one hand, to the positive pole of the battery 21 via a capacitor 82 and, on the other hand, to the base of the transistor 70. The base of the transistor 71 is connected to the collector of the transistor 70.

By way of example, the resistors 75, 76 and 80 all have a value of the order of 1.8 Mohms and the capacitor has a value of 1 nF.

Figure 4:
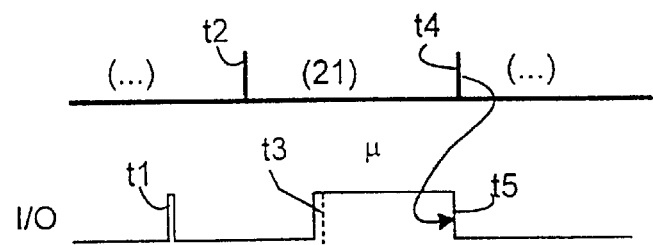
FIG. 4 shows a timing diagram explaining the operation of the invention.

The operation of such a detector is explained with the aid of FIG. 4. This detector operates by means of the I/O terminal of the assembly 50. At the instant the battery is put in place and the I/O terminal has a low voltage level corresponding to logic level <<0>>, and the transistor 71 receives no bias on its and is not conductive. Also, the capacitor 82 is in a discharged state and the transistor 70 is not conductive. A pulse on the base of the transistor 71 in response to a pulse supplied to terminal 62 by the assembly 50; renders the transistor 71 conductive. Because the battery is connected to the terminal 64, the capacitor 82 becomes charged, which renders the transistor 70 conductive. There is thus a high voltage level on the terminal 62; this terminal consequently assumes the logic <<1>> value. If the battery 21 is disconnected, the capacitor 82 is discharged via in the base-emitter junction of the transistor 70, and consequently the terminal 62 is again at ground potential. The discharged capacitor prevents that the transistor 70 becomes conductive too fast, thus the undesired effects of microcutoffs due to bounce of poor contacts of the connector of the accumulator are avoided.

The operation will now be explained with the aid of FIG. 4. The instant t1 is the appearance of a pulse emitted on the I/O terminal, while the battery 21 is disconnected, the voltage on the I/O terminal after the pulse has been supplied is thus at ground level. At the instant t2 the battery 21 is put in operation again. The voltage on the I/O the terminal remains zero as long as the pulse has not been supplied by assembly 30. After the appearance of this pulse at instant t3, the voltage on the I/O terminal assumes a high value, and remains at that value until instant t4 which is just prior to the capacitor 82 becoming sufficiently discharged to render transistor 70 non-conductive. After such discharging of the capacitor 82, the voltage on the I/O terminal logic <<0>> value at the instant t5.

Figure 5:
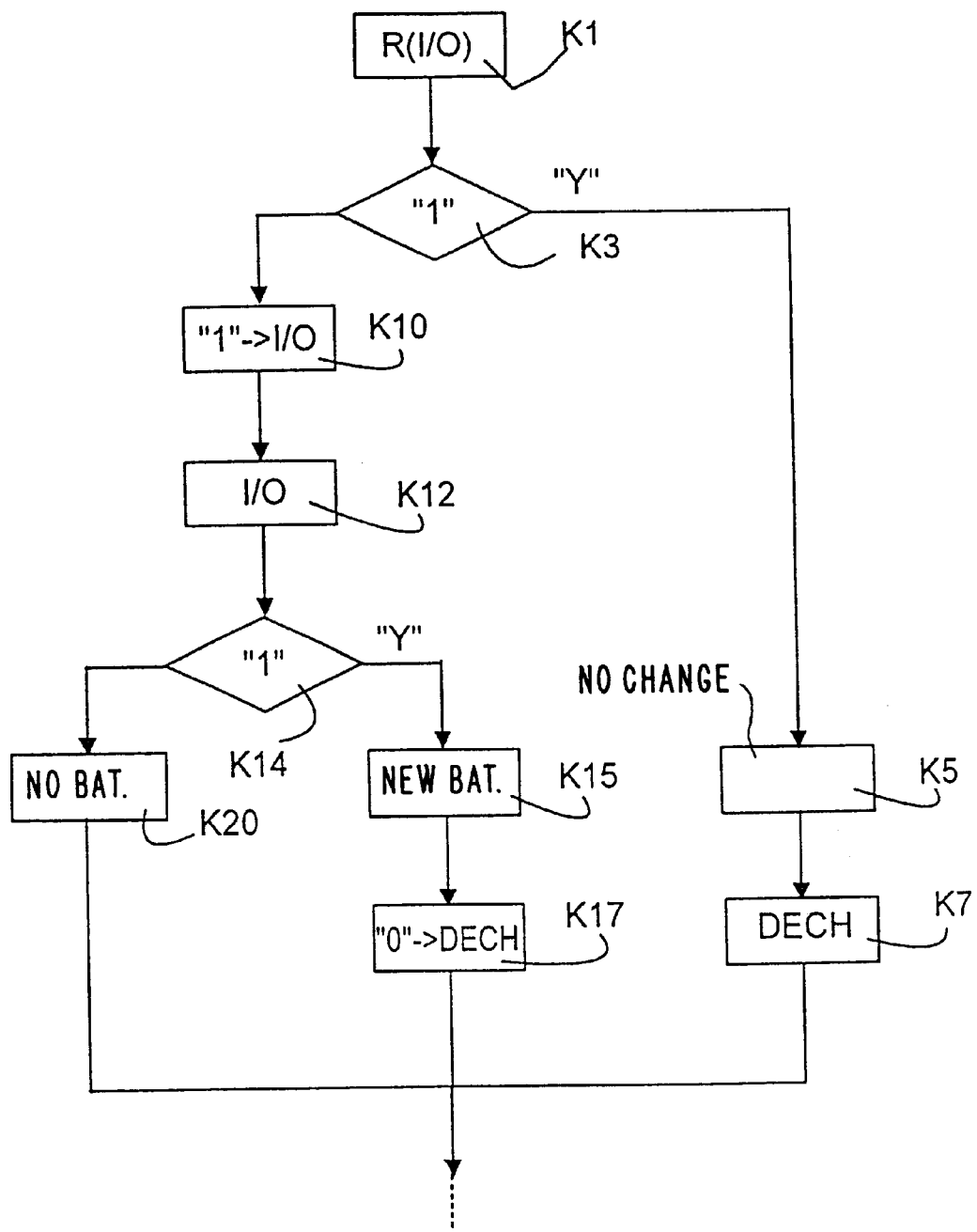
FIG. 5 shows a flow chart explaining the operation of the invention.

The flow chart of FIG. 5 shows how a dialogue may be held between the assembly 50 and the detector 60.

Box K1 of this flow chart indicates the reading of the voltage at the I/O access, which occurs when the apparatus is switched on. If this value is <<1>>, box K3, then it is estimated that the battery has not been changed, box K5. The contents of the counter DECH are initialized by its value contained in the non-volatile memory 52, box K7.

If the test of the box K3 indicates a zero voltage, a pulse is supplied to the I/O terminal, box K10. Thereafter, the voltage is read in box K12. A test is then made in box K14. If a voltage is present, a new battery is involved, box K15, consequently, the contents of the counter DECH are re-initialized in box K17. If the voltage is zero, there is no battery, box K20. The apparatus then operates on the power line mains 22.

It may be noted that terminal 62 could be replaced by two access points. It is possible to read the charge state of the capacitor by measuring directly the voltage on its electrodes, the pulse for enabling the connection of the capacitor to the battery being applied to the common node of resistors 75 and 76.

What is claimed is:

1. An electrical apparatus having supply terminals to be supplied by an accumulator characterized in that it includes a detecting circuit for providing an active signal when a change of battery is detected.

2. An electrical apparatus having supply terminals to be supplied by a battery, said apparatus comprising a detecting circuit for detecting a change of battery and providing an output signal when the change of battery is detected, wherein said detecting circuit is formed by:

a capacitor, a first access, a second access, switching means for connecting the capacitor to the supply terminals when an enabling signal is applied to a first access point of the apparatus, and measuring means for supplying said output signal to a second access point of the apparatus when said capacitor is charged.

3. The apparatus as claimed in claim 2, wherein the first and second access points form one control terminal.

4. The apparatus as claimed in claim 3, wherein said control terminal is connected to a microprocessor assembly.

5. A method implemented in an electrical apparatus having supply terminals to be supplied by a battery, a charge-discharge counter for determining the charge state of the battery, a detecting circuit for detecting a change of battery and providing an output signal at a terminal when the change of battery is detected, and means for resetting said charge-discharge counter in response to the output signal of the detecting circuit, said method comprising:

first reading of signal at said terminal, assuming the presence of the battery if said reading has a first value, producing a pulse if said reading has a second value different from said first value, second reading of signal at said terminal after said pulse, resetting said charge-discharge counter if said second reading has the first value, and indicating that the battery is absent if said second reading has the second value.

* * * * *

UNITED STATES PATENT AND TRADEMARK OFFICE
CERTIFICATE OF CORRECTION

PATENT NO.       : 6,265,849 B1
APPLICATION NO.  : 09/469446
DATED            : July 24, 2001
INVENTOR(S)      : Eloi Ricordel It is certified that error appears in the above-identified patent and that said Letters Patent is hereby corrected as shown below:

Column 3, Line 37, cancel the text beginning with "1. An electrical apparatus" to and ending "battery is detected." at Column 3, Line 40, and insert the following claim:

1. An electrical apparatus having supply terminals to be supplied by a battery, said apparatus comprising:
a charge-discharge counter for determining the charge state of the battery,
a detecting circuit for detecting a change of battery and providing an output signal when the change of battery is detected, and
means for resetting said charge-discharge counter in response to said output signal of the detecting circuit.

Column 4, Lines 7-8, cancel the following text "a first access, a second access,".

Signed and Sealed this

Thirtieth Day of November, 2010

David J. Kappos
*Director of the United States Patent and Trademark Office*